United States Patent [19]

Weimer et al.

[11] Patent Number: 4,669,373
[45] Date of Patent: Jun. 2, 1987

[54] TWO-SIDED COOKING DEVICE FOR A GRILL

[75] Inventors: Ralph Weimer, Wheaton; Thaddeus J. Kalowski, Lisle; Richard W. Dorr, Lockport; Robert A. Novy, LaGrange Park, all of Ill.

[73] Assignee: Restaurant Technology, Inc., Oak Brook, Ill.

[21] Appl. No.: 904,520

[22] Filed: Sep. 5, 1986

Related U.S. Application Data

[63] Continuation of Ser. No. 691,411, Jan. 14, 1985, abandoned.

[51] Int. Cl.$^4$ ............................................. A47J 37/06
[52] U.S. Cl. .................................... 99/349; 99/372; 99/389; 99/422; 219/524
[58] Field of Search ................ 99/349, 340, 426, 427, 99/422, 372, 376, 379, 389; 219/524, 525

[56] References Cited

U.S. PATENT DOCUMENTS

| | | | |
|---|---|---|---|
| 1,271,796 | 7/1918 | Stivers | 99/349 X |
| 2,040,676 | 5/1936 | Stevens | 99/349 X |
| 2,423,963 | 7/1947 | Coffman | 99/349 |
| 2,522,175 | 9/1950 | Hill | 99/349 |
| 3,312,161 | 4/1967 | Nanna | 99/379 X |
| 4,165,682 | 8/1979 | Weiss | 99/372 X |
| 4,320,699 | 3/1982 | Binks | 99/349 |
| 4,483,239 | 11/1984 | Mueller | 99/349 X |

FOREIGN PATENT DOCUMENTS

| | | | |
|---|---|---|---|
| 596315 | 4/1934 | Fed. Rep. of Germany | 99/349 |
| 756826 | 12/1933 | France | 99/349 |
| 935216 | 7/1948 | France | 99/349 |

Primary Examiner—Billy J. Wilhite
Attorney, Agent, or Firm—Jenner & Block

[57] ABSTRACT

A compact two-sided cooking device is disclosed for use with an existing grill to permit two-sided cooking of food products, such as hamburger patties, on a relatively limited basis. The device includes a cooking assembly having an electrically-powered cooking platen which can be selectively positioned on food products on the grill for effecting accelerated two-sided cooking thereof. The present cooking device has been particularly configured for use in conjunction with, and for rocking movement on, a commercially-sized restaurant grill, and provides greatly reduced cooking times so that a customer's order can be freshly and efficiently prepared even during relatively slow business hours.

23 Claims, 8 Drawing Figures

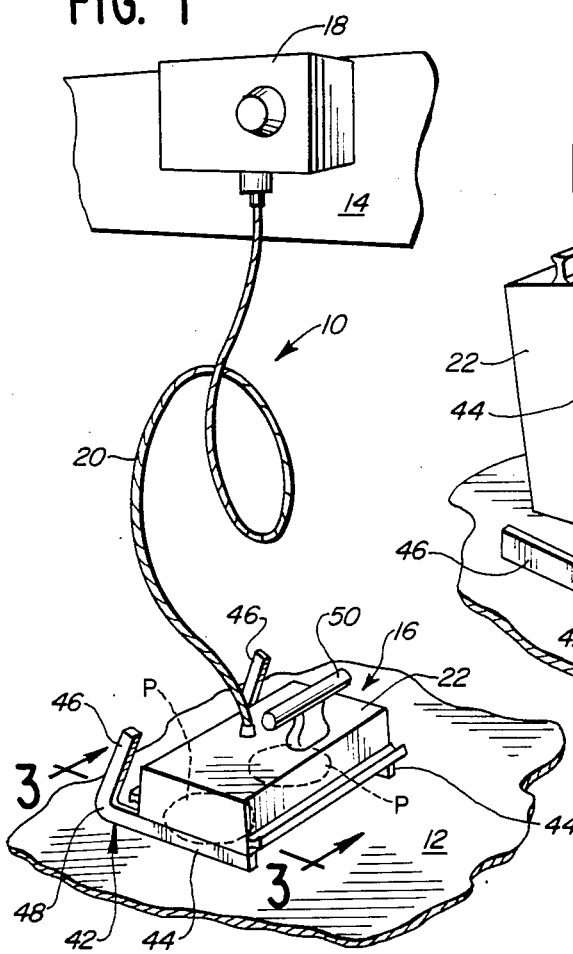
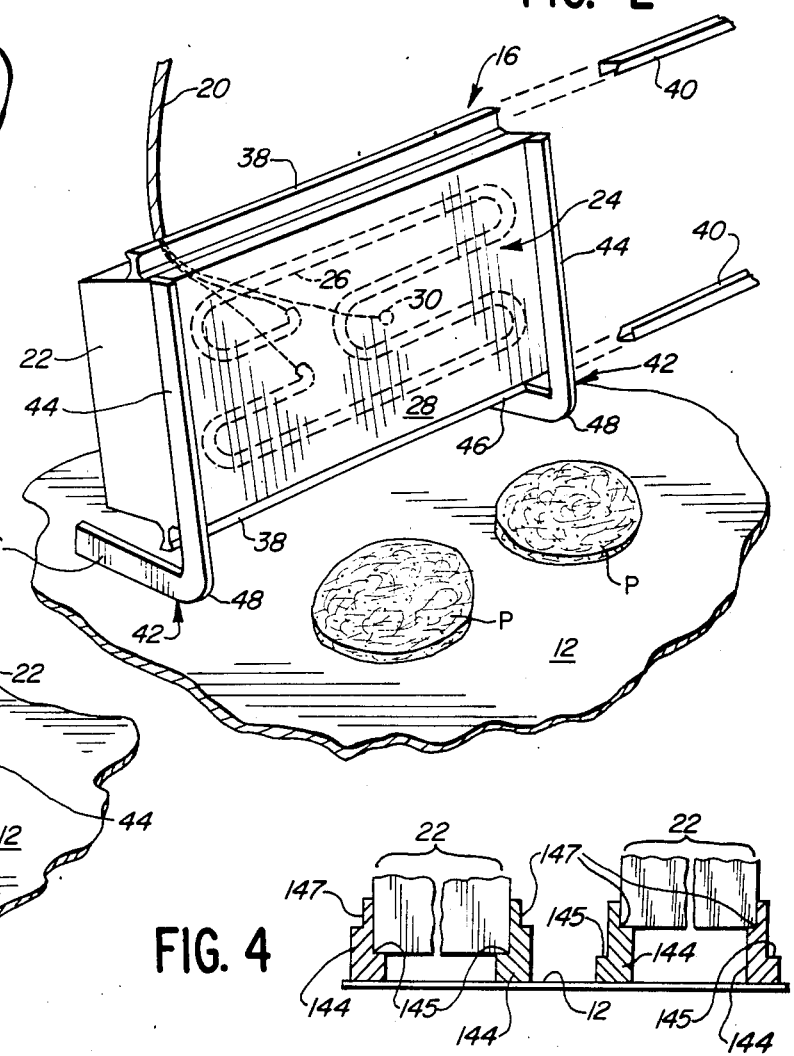
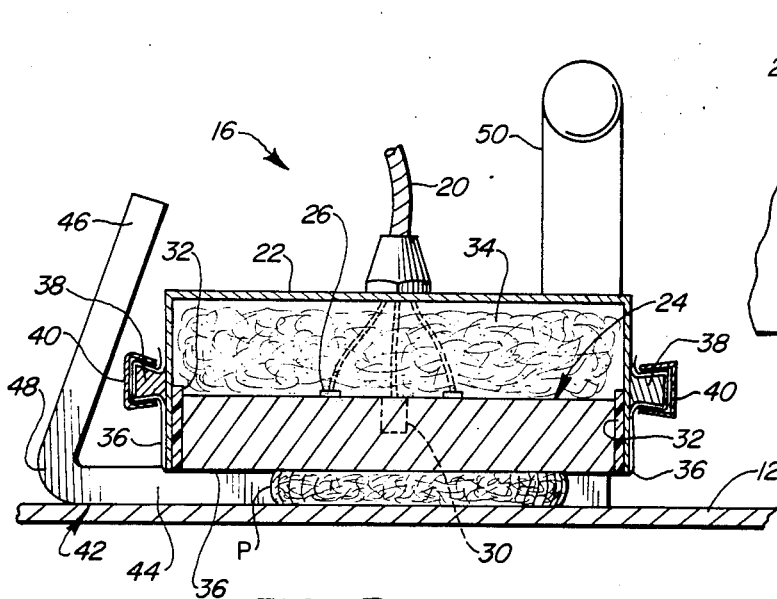
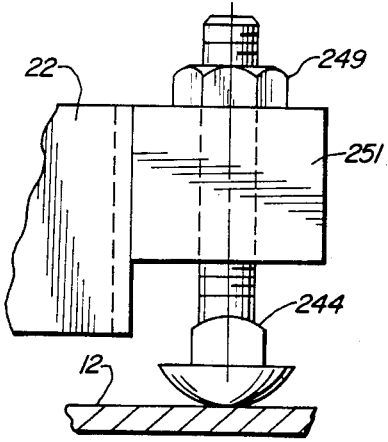
FIG. 1
FIG. 2
FIG. 3
FIG. 4
FIG. 5

TWO-SIDED COOKING DEVICE FOR A GRILL

This is a continuation of application Ser. No. 691,411 filed Jan. 14, 1985, now abandoned.

TECHNICAL FIELD

The present invention relates generally to arrangements for effecting two-sided cooking of food products, and more particularly to a relatively compact cooking device for use with an existing grill to permit efficient two-sided cooking of food products such as hamburger patties.

BACKGROUND OF THE INVENTION

The sensory appeal of food products such as hamburger patties and the like is significantly enhanced when the products are served as soon as possible after their preparation. Accordingly, many commercial restaurant establishments carefully monitor the time period between preparation of food products and their service to customers to assure the sensory appeal of the products and customer satisfaction.

During relatively busy hours of operation in a restaurant, it is usually possible to maintain a generally continuous flow of cooked food products so that customers can be served quickly and efficiently, with the food products being served very shortly after their preparation. However, during relatively slow hours of operation, such as between customary meal times, it is generally not possible to maintain such a continuous flow of food products if the products are to be served within the desired time after their preparation. As such, in order to assure that only high quality products are served, it is frequently necessary that product preparation only be initiated after a customer's order is received. Such product preparation is also generally necessary when a customer requests a "special", non-standard order. While customers are thus assured of receiving food products of the desired high quality and sensory appeal, some customer dissatisfaction can result from the additional time a customer must wait for individual preparation of the customer's order.

It is thus desirable to provide an arrangement by which the cooking time for food products such as hamburger patties can be significantly reduced to permit quick and efficient preparation of a customer's order during periods of operation when a continuous flow of cooked products is not being maintained. Customer satisfaction is greatly enhanced since only products which are freshly prepared are served, with a customer's order being filled in a relatively short time as compared to the time required for preparing food products by conventional one-sided grilling.

SUMMARY OF THE INVENTION

The cooking device of the present invention is in the naturre of an accessory for addition to an existing grill to permit two-sided cooking of hamburger patties and like food products on a relatively limited basis. The device is particularly suited for use in conjunction with a commercially-sized grill, and can conveniently be placed in an out-of-the-way disposition adjacent or on top of the grill when the grill is used in a normal manner for one-sided cooking. When it is desired to minimize the cooking time for relatively small batches of the hamburger patties, the patties can be placed on the grill and the cooking device of the present invention conveniently disposed on top of them, thus effecting highly efficient two-sided cooking of the patties.

The cooking device of the present invention includes a relatively compact cooking assembly which is configured for manipulation by hand for selective positioning on the associated grill. The assembly includes a housing which is joined to an electrically-powered cooking platen which defines a preferably generally rectangular expansive cooking surface. In the preferred embodiment, the present device includes a control assembly which is positiooned remote from the cooking assembly (such as on an exhaust hood or the like above the grill), with a heat-resistant, flexible electrical cable operatively joining the control assembly and the cooking platen for regulation of the platen. The control assembly is thus desirably positioned away from the heat of the grill, with the flexible cable permitting the cooking assembly to be selectively positioned on the grill as desired.

To effect two-sided cooking of hamburger patties or other food products, the cooking assembly is positioned above the patties after they have been placed on the grill. In this regard, it has been found that food products such as hamburger patties exhibit enhanced sensory appeal when a predetermined spacing is maintained between the cooking surface of the heated platen and the associated grill. To this end, the cooking assembly includes spacing means operatively joined to the cooking platen for maintaining the desired predetermined spacing between the cooking surface of the platen and the grill.

In the illustrated embodiments of the present invention, the arrangement for spacing the cooking surface of the platen from the grill is provided by a pair of support rails positioned on respective first opposite sides of the platen cooking surface. By this arrangement, the second opposite sides of the cooking surface are "open" so that meat juices are not trapped, which could otherwise result in "stewing" of the hamburger patties.

In one illustrated embodiment of the invention, each support rail is generally L-shaped, and includes a spacing portion adjacent to the platen cooking surface for providing the spacing means of the assembly. Each support rail further includes a support portion which extends away from the respective spacing portion, and which is preferably joined to the spacing portion by an arcuate corner portion.

By this arrangement, the cooking assembly can be easily manipulated between a first lowered or active cooking position wherein its cooking surface is positioned in generally parallel relation to the grill for two-sided cooking, and a second upright position wherein the assembly is supported by the support portions of the two support rails. In this second inactive position, the cooking surface of the platen is positioned away from the grill in a generally vertical orientation. The preferred arcuate configuration of the corners of the support rails permits the assembly to be readily manipulated between its first and second positions by rocking or pivoting the assembly about the arcuate corner portions without lifting the assembly from the surface of the grill. This preferred arrangement permits convenient "roll over" of the cooking assembly between its active use and inactive non-use positions, and further permits the cooking assembly to be left on top of the grill when the assembly is not being used for two-sided cooking.

Additional features of the present cooking device facilitate its efficient and convenient use. In the preferred form, low-friction means are provided in association with the cooking surface of the platen for contact with the hamburger patties or other food products. While such low-friction means can be provided in the form of a suitable low-friction composition applied and bonded directly to the cooking surface, the illustrated embodiments include a low-friction, heat-transferring sheet juxtaposed with the cooking surface of the platen for contact with the hamburger patties. The cooking assembly preferably includes an arrangement of attachment rails and clips at the second opposite sides of the cooking surface for removably mounting the low-friction sheet in juxtaposition with the platen cooking surface.

While one illustrated embodiment of the present invention includes generally L-shaped support rails for maintaining the desired predetermined spacing betwewen the platen cooking surface and the associated grill, a further illustrated embodiment includes differently configured support rails which are arranged to provide the removable mounting of the low friction sheet in addition to the attachment clips and rails. A pair of spring clips are provided for removably joining the two support rails of this further embodiment to the cooking platen, with marginal edge portions of low-friction sheet held captive between the cooking platen and the support rails. Thus, the low-friction sheet is removably retained in position at first opposite sides and second opposite sides of the expansive cooking surface, thus desirably isolating the cooking surface from meat juices and the like on the grill.

Other features and advantages of the present invention will become readily apparent from the following detailed description, the accompanying drawings, and the appended claims.

BRIEF DESCRIPTION OF THE DRAWINGS

FIG. 1 is a perspective view of the present two-sided cooking device shown in an active position of use with an associated grill;

FIG. 2 is a perspective view of a cooking assembly of the present cooking device shown in an inactive, non-use position on the associated grill;

FIG. 3 is a cross-sectional view of the cooking assembly shown in FIG. 2 taken generally along lines 3—3 of FIG. 1;

FIG. 4 illustrates a modified form of the present cooking device which permits selective adjustment of the relative spacing of the device with respect to the associated grill;

FIG. 5 is a further modified embodiment of the present cooking device which permits selective adjustment of the spacing of the device relative to the associated grill;

DETAILED DESCRIPTION

Figure 6:
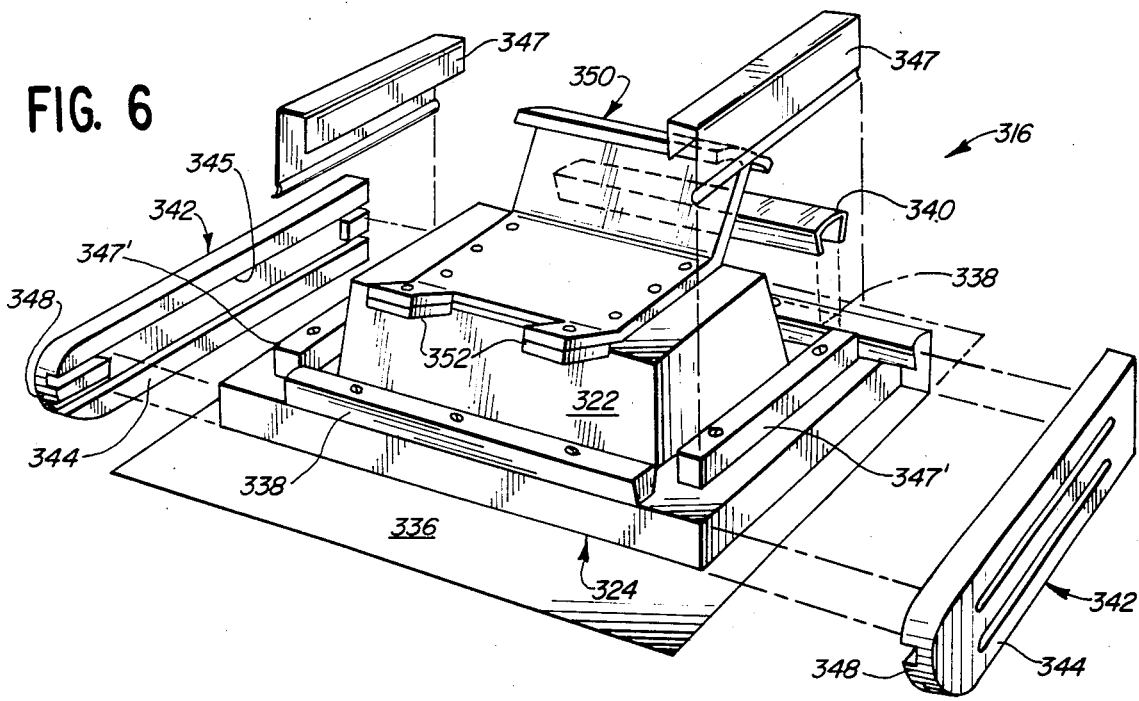
FIG. 6 is a partially-exploded perspective view of an alternate embodiment of the cooking assembly of the present device.

While the present invention is susceptible of embodiment in various forms, there is shown in the drawings and will hereinafter be described presently preferred embodiments, and modifications thereof, with the understanding that the present disclosure is to be considered as an exemplification of the invention, and is not intended to limit the invention to the specific embodiments illustrated.

With reference first to FIG. 1, therein is illustrated a two-sided cooking device 10 embodying the principles of the present invention. Cooking device 10 is shown in conjunction with a grill 12 having a planar, horizontal cooking surface, and an exhaust hood 14 positioned above grill 12. Such a grill and exhaust hood arrangement are typical of the equipment provided in a commercial restaurant establishment for preparation nof food products such as hamburger patties, designated as patties P in the drawings, with the present cooking device being particularly configured for use in conjunction with such a commercially-sized grill.

In the preferred form, the present cooking device includes a cooking assembly 16 which is positionable on top of grill 12, a control assembly 18 positioned remote from the cooking assembly such as on hood 14, and a heat-resistant flexible electrical cable 20 which operatively joins the cooking and control assemblies. Heat-resistant cable 20 may be in the nature of a metal-clad or armored electrical cable, which not only protects the electrical wiring therein from the heat of grill 12, but which further resists damage from inadvertant contact from metal spatulas or the like typically used on the grill. This preferred provision of heat-resistant cable 20 for the present cooking device permits the cooking assembly 16 to be positioned on the grill 12 during both periods of active use and inactive non-use, while desirably positioning the control assembly 18 away from grill 12 so that the controls are not adversely affected by the heat of the grill.

With particular reference to FIGS. 2 and 3, the preferred configuration of the cooking assembly 16 is illustrated. The cooking assembly includes a suitably metallic box-like housing 22 having depending sides which define an open bottom (referring to the orientation of FIG. 3), with a cast aluminum cooking platen 24 joined to and positioned within the housing 22. An electrically-powered heating element 26 is provided within the cast platen for effecting heating thereof, with the platen defining a preferably generally rectangular planar expansive cooking surface 28 (FIG. 2) which is positionable above patties P on the grill for effecting two-sided cooking of the patties.

The cooking platen 24 preferably includes an integral temperature sensor 30 (such as a thermocouple), with the temperature sensor 30 and the heating element 26 operatively joined with control assembly 18 via flexible cable 20. The control assembly preferably includes sitable thermostatic controls and timing devices for regulating the electrical power supplied to heating element 26.

In order to minimize heating of housing 22 during operation of cooking platen 24, cooking assembly 16 preferably includes suitable insulation disposed between the cooking platen and the housing. As best shown in FIG. 3, such insulation may include suitable sheet insulation 32 positioned between the sides of cooking platen 24 and the depending sides of housing 22, and suitable fibrous insulation 34 positioned on top of cooking platen 24 within housing 22.

To facilitate convenient cleaning of cooking assembly 16, the expansive cooking surface 28 of cooking platen 24 is preferably provided with a suitable low-friction, "non-stick" material in association therewith so that patties P and meat juices do not adhere to the cooking surface. While such low-friction material (such as comprising polytetrofluoroethylene) can be applied and bonded directly to cooking surface 28, it is presently preferred that cooking assembly 16 be provided with a removable "non-stick" low-friction sheet 36, such as comprising polytetrafluoroethylene, juxtaposed with the cooking surface 28. Suitable polytetrafluoroethylene sheet material is available from Chemical Fabrics Corporation, North Bennington, Vt. It will be noted that low-friction sheet 36 is not shown in FIG. 2, and thus cooking surface 28 of platen 24 is visible.

Because it is ordinarily necessary to periodically replace the low-friction sheet 36, cooking assembly 16 preferably includes an arrangement for removably mounting the sheet 36 in juxtaposition to the cooking surface of platen 24. Specifically, a pair of attachment rails 38 are joined to housing 22 at respective opposite sides thereof, with a pair of attachment clips 40 provided for respective interengagement with attachment rails 38. Sheet 36 is thus mounted by positioning the sheet adjacent to the cooking surface 28 of platen 24, with the opposite ends of the sheet respectively fitted about attachment rails 38. Attachment clips 40 are then respectively fitted to the attachment rails 38 such that the sheet 36 is disposed between each attachment clip and its respective rail. The illustrated "dovetail" configuration of the attachment rails and clips firmly secures the sheet 36 in juxtaposition with cooking surface 28 of platen 24.

As noted, two-sided cooking of patties P is effected by manipulation of cooking assembly 16 such that the cooking surface of the platen 24 is positioned above the patties, with low-friction sheet 36 in contact with the upper surface of the patties. In this regard, testing has shown that the sensory appeal of hamburger patties and like food products is enhanced when a predetermined spacing is maintained between the cooking surface of platen 24 and the grill 12. Accordingly, cooking assembly 16 includes a pair of support rails 42 joined to housing 22 on respective first opposite sides of the cooking surface of platen 24 (with attachment rails and clips 38 and 40 thus being positioned generally at respective second opposite sides of the cooking surface). Each support rail 42 is preferably of a generally L-shaped configuration, with each including a spacing portion 44 disposed adjacent to the cooking surface of platen 24, and a support portion 46 which extends at a preferably acute angle away from spacing portion 44. The spacing portion 44 and the support portion 46 of each rail 42 are preferably joined by an arcuate corner portion 48.

As best illustrated in FIG. 3, the spacing portion 44 of each support rail 42 maintains the desired predetermined spacing between cooking platen 24 and grill 12 during two-sided cooking of patties when cooking assembly 16 is disposed in this first lowered position. As will be recognized, the provision of spacing portions 44 only at respective first opposite sides of cooking surface 28 configures cooking assembly 16 such that the second opposite sides of cooking surface 28 are "open" during two-sided cooking. Thus, the region beneath the cooking surface is not "closed", which could otherwise undesirably result in "stewing" of patties P during two-sided cooking of the patties.

Support rails 42 additionally function to support the cooking assembly 16 in a second upright position (FIG. 2) wherein the cooking surface of platen 24 is disposed generally vertically and away from grill 12 as cooking device 16 is supported by portions 46 of support rails 42. The provision of arcuate corner portions 48 in each support rail 42 facilitates convenient manipulation of cooking assembly 16 between its first and second positions. Specifically, this preferred configuration of the support rails permits the cooking assembly 16 to be rocked or "rolled over" or pivoted about the corner portions 48, without lifting the cooking assembly off of the grill, as the cooking assembly is manipulated between its active use and inactive, non-use positions. Handle 50 joined to housing 22 facilitates manipulation in this manner, with the handle 50 preferably disposed above housing 22 when the cooking assembly 16 is in its lowered cooking position, thus minimizing heating of the handle by grill 12. Support rails 42 permit the cooking assembly 16 to be left on grill 12 even when the cooking assembly is in its upright, non-use position, thus desirably minimizing spread of meat juices and the like away from the grill while preventing excessive heat loss from the cooking assembly for energy efficiency.

The accelerated two-sided cooking provided by the present invention is particularly advantageous for reducing the cooking time for food products which cannot be quickly prepared by conventional one-sided cooking. For example, conventional one-sided cooking of frozen one-quarter pound ground beef hamburger patties is normally on the order of four and one-half minutes. In the context of efficient restaurant service, this time period can be unacceptably long if a customer's order is to be freshly prepared. In comparison, the present device permits two-sided cooking of frozen one-quarter pound patties in approximately two minutes.

Since two-sided cooking is to be performed on a relatively limited basis, the above-described embodiment of the present invention has been relatively dimensioned to simultaneously cook a pair of one-quarter pound meat patties. A 1500 watt heating element 26 has been successfully used, with platen 24 being maintained in a temperature range of about 375°–450° F. In this current embodiment, the spacing between the cooking surface of platen 24 and grill 12 which is provided by spacing portions 44 of rails 42 is preferably on the order of 0.4 to 0.5 inch, with 0.42 inch being most preferred. This spacing is slightly less than the normal thickness of commercially available one-quarter pound meat patties, thus assuring enhanced initial contact between low-friction sheet 36 of the cooking assembly and the patties for effecting good "sear" of the meat.

As two-sided cooking progresses, the weight of cooking assembly 16 acts to reduce the thickness of the patties until the cooking surface of the assembly is maintained in its predetermined spaced relation by spacing portions 44. Maintaining this predetermined spacing prevents undue compaction of the meat patties, which could otherwise adversely affect the sensory appeal of the cooked product. The cooking assembly 16 is preferably configured to exert sufficient pressure on the patties during the initial stages of two-sided cooking for effecting the desired "sear" of the patties. For example, a current embodiment of the present invention having a cooking assembly 16 sized to cook a pair of one-quarter pound patties is preferably provided with a weight on the ordef of 10–12 pounds. Naturally, it is desired that the cooking assembly 16 not be excessively heavy so as to not detract from its convenient manipulation by hand.

FIG. 4 illustrates a modified form of the spacing portions of support rails 42 of cooking assembly 16, these spacing portions being designated 144 in FIG. 4. This configuration of spacing portions 144 permits the predetermined spacing between the cooking surface of assembly 16 and the grill 12 to be selectively adjusted. Specifically, each spacing portion 144 defines a pair of ledges 145 and 147. These ledges 145 and 147 are configured to receive the lower corners of housing 22 of assembly 16, and provide two different spacings for the cooking surface of the assembly relative to grill 12.

The left-hand side of FIG. 4 illustrates housing 22 positioned on ledges 145 of support portions 144, thus positioning the cooking surface of the assembly 16 in relatively closely spaced relation to the grill 12 (such as for two-sided cooking of one-tenth pound meat patties). By contrast, the right-hand portion of FIG. 4 illustrates positioning of housing 22 on ledges 147 of support portions 144, thus providing relatively greater spacing between the cooking surface of the platen within the housing and the grill 12.

Previously described support rails 42 can be configured to include support portions 144 such as shown in FIG. 4, with suitable removable fasteners or the like being employed for removably securing the support rails to the housing 22. The support rails 42 having support portions 144 can be selectively appropriately positioned with respect to housing 22 so that the pair of ledges 145 or 147 to be used for supporting the housing 22 are positioned in inwardly facing relation to each other.

FIG. 5 illustrates an alternate embodiment for maintaining the desired predetermined spacing between the cooking surface of the platen within housing 22 and the grill 12, with the arrangement of FIG. 5 being infinitely selectively adjustable within a predetermined range. The spacing arrangement shown in FIG. 5 can be used in place of previously described spacing portions 44 of support rails 42. The arrangement shown in FIG. 5 includes a selectively adjustable, threaded spacing member 244 preferably having a rounded head portion for contact with grill 12. The threaded member 244 is held by a suitable lock nut 249 in fixed relation with respect to a threaded block 251 through which the member 244 extends.

By providing the adjustable spacing assembly of FIG. 5 generally at each of the four corners of the housing 22 of cooking assembly 16, the desired predetermined spacing between the cooking surface of the platen within housing 22 and the associated grill is maintained during two-sided cooking.

Figure 7:
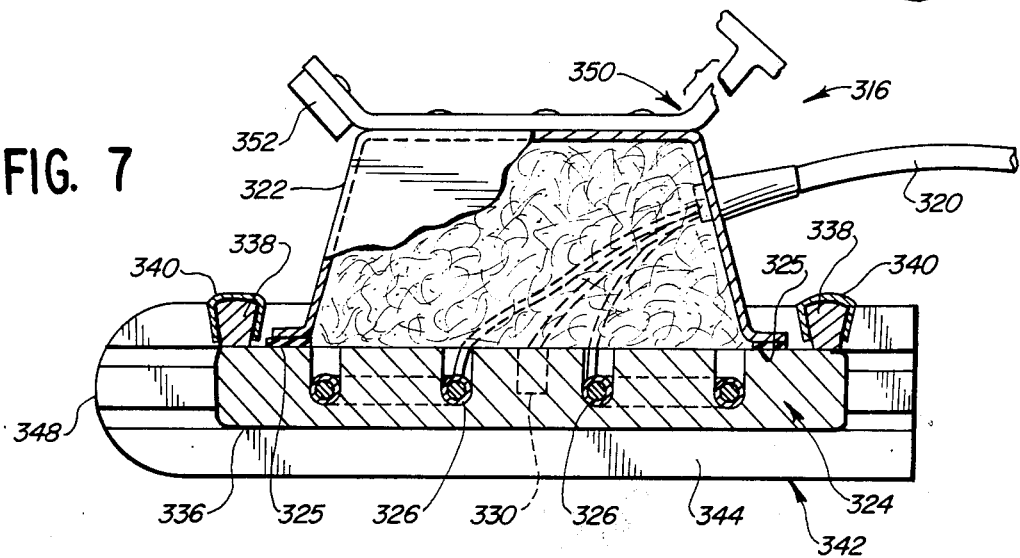
FIG. 7 is a cross-sectional view of the alternate cooking assembly shown in FIG. 6.
Figure 8:
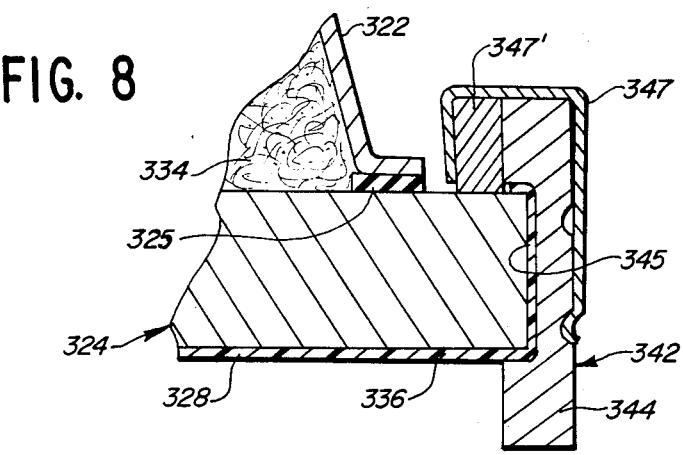
FIG. 8 is a further, relatively enlarged cross-sectional view of the alternate cooking assembly shown in FIGS. 6 and 7.

With reference now to FIGS. 6–8, therein is illustrated a further embodiment of the cooking assembly, previously designated 16, of the present invention. In many respects, this further embodiment is like the previous embodiment, and accordingly, corresponding components of this further embodiment are designated with like reference numerals in the three-hundred series. This further embodiment of the cooking assembly, designated 316, has been configured to include a removable, low-friction "non-stick" sheet juxtaposed with the cooking surface of the assembly, with the cooking surface isolated from the associated grill by the low-friction sheet.

With particular reference to FIGS. 6 and 7, cooking assembly 316 is operatively joined with associated controls such as 18 by a heat-resistant electrical cable 320. The cooking assembly includes a suitably metallic housing 22 joined to a cast aluminum cooking platen 324, with a suitable heat-resistant gasket 325 interposed between the housing and the cooking platen. An electrically-powered heating element 326 is provided within the cast platen for effecting heating thereof, with the platen defining a preferably generally rectangular planar expansive cooking surface 328 (FIG. 8) which is positionable above patties P on the grill for effecting two-sided cooking of the patties. An integral temperature sensor 330 is provided within the cooking platen, with the temperature sensor 330 and the heating element 326 operatively joined with previously-described control assembly 18 via flexible heat-resistant cable 320. Suitable fibrous insulation 334 is provided between housing 322 and platen 324 to minimize heating of the housing by the cooking platen, with the gasket 325 acting to resist penetration of meat juices and the like into insulation 334 within the housing.

As noted, this embodiment of the cooking assembly of the present invention includes a low-friction sheet juxtaposed to cooking surface 328 of the cooking platen such that the cooking surface is isolated from the associated grill. Accordingly, low-friction sheet material 336 is provided, with the illustrated arrangement including means for removably mounting the low-friction sheet at the first opposite sides and the second opposite sides of the cooking surface 328.

Like the previously-described embodiment 16 of the cooking assembly, cooking assembly 316 includes a pair of attachment rails 338 and attachment clips 340 which are positioned on platen 324 generally at respective second opposite sides of the platen's cooking surface for removably securing corresponding marginal edge portions of sheet 336 in juxtaposition to cooking surface 328. In distinction from the previously-described embodiment, cooking assembly 316 includes modified support rails 342 which are configured to further removably mount sheet 336 at respective first opposite sides of cooking surface 328.

To this end, each of the support rails 342 is provided with a generally elongated configuration, with each including a spacing portion 344 for maintaining the desired predetermined spacing between the cooking surface 328 and the associated grill during two-sided cooking of patties P.

Removable mounting of low-friction sheet 336 is facilitated by configuring each support rail 342 to define an elongated recess 345, with each recess 345 dimensioned to receive a respective edge portion of cooking platen 324. A respective marginal edge portion of sheet 336 is thus held captive between the platen 324 and each support rail 342 (see FIG. 8). To permit removable mounting of sheet 336 in this manner, support rails 342 are arranged for removable mounting by removably securing the support rails to the cooking platen 324. A pair of attachment spring clips 347 are provided for this purpose, with each clip 347 configured to fit over a respective attachment rail 347' mounted on platen 324 and a respective one of the support rails 342. As illustrated, the outwardly facing surface of each support rail 342 preferably defines a groove for coaction with its respective spring clip 347 so that the support rails are securely, yet removably, joined to the cooking platen 324. It will be noted that in the illustrated embodiment, each support rail 342 includes a pair of grooves on its outwardly facing surface, thus facilitating interchangeability of the two support rails.

As in the previously-described embodiment of the cooking assembly of the present invention, cooking assembly 316 has been configured for rocking or pivoting movement between its lowered, use position and a generally upright, non-use position. To facilitate such rocking movement without lifting the cooking assembly from the associated grill, each of the support rails 342 includes an arcuate end portion 348 about which the assembly can be rocked, with handle 350 joined to housing 322 facilitating convenient rocking movement of the cooking assembly. In this embodiment, support of the cooking assembly 316 in its generally upright, non-use position is accommodated by a pair of support struts 352 provided on the handle 350, with the support struts thus functioning in the nature of support portions 46 of support rails 42 of the previously-described embodiment.

FIG. 6 generally illustrates removable mounting of low-friction sheet 336 in juxtaposition to the cooking surface of cooking platen 324. Opposite marginal edge portions of the sheet 336 are wrapped around attachment rails 338, with attachment clips 344 fitted to the attachment rails so that these edge portions of the sheet 336 are securely retained. The sheet 336 is further mounted on cooking platen 324 by wrapping the sheet upwardly about the opposite edges of cooking platen 324, with the support rails 342 then fitted to the cooking platen so that the sheet 336 is held in captive relation. Spring clips 347 are then respectively fitted to the support rails, with the resultant configuration being such that the cooking surface of the platen 324 is isolated from the associated grill by the sheet 336. This arrangement can be desirable for minimizing any contact of meat juices of the like with the cooking surface of the heated platen.

From the foregoing, it will be observed that numerous modifications and variations can be effected by those skilled in the art without departing from the true spirit and scope of the novel concept of the present invention. It is to be understood that no limitation with respect to the specific embodiments disclosed herein are intended or should be inferred. The illustrated embodiments, of course, are intended to cover by the appended claims all such modifications as fall within the scope of the claims.

What is claimed is:

1. A cooking device for two-sided cooking of food products such as hamburger patties on a grill, comprising:
    electrically-powered platen means defining an expansive cooking surface and adapted to be located at any one of a horizontal range of positions on said grill;
    flexible electrical cable means of sufficient length to supply power to said platen means at any one of the horizontal range of positions of said platen means on said grill; and
    spacing means affixed to said platen means but free of said grill for maintaining a predetermined spacing between said platen expansive cooking surface and said grill when said platen cooking surface is positioned in closely spaced, generally parallel relation to said grill, whereby said platen means is positionable above food products on said grill at any one of a range of horizontally spaced positions for effecting two-sided cooking of said food products, multi-position curved arm support means for supporting said platen means with said cooking surface positioned in either of two positions, the positions including a first active position having said cooking surface disposed above said food products for effecting two-sided cooking thereof, and a second inactive position having said cooking surface positioned away from said grill in a generally upright position.

2. A two-sided cooking device in accordance with claim 1, including
    means for selectively adjusting said predetermined spacing provided by said spacing means.

3. A two-sided cooking device in accordance with claim 1, including
    low-friction means provided in association with said expansive cooking surface of said platen means for contact with said food products.

4. A two-sided cooking device in accordance with claim 3, wherein
    said low-friction means comprises low-friction sheet means juxtaposed with said cooking surface of said platen means for contact with said food products, and means for removably mounting said sheet means in juxtaposition to said cooking surface.

5. A two-sided cooking device in accordance with claim 4, wherein
    said means for removably mounting said sheet means comprises support rail means and means for removably securing said support rail means to said platen means, said support rail means providing said spacing means for maintaining said predetermined spacing between said expansive cooking surface and said grill.

6. A two-sided cooking device in accordance with claim 4, wherein
    said means for removably mounting said sheet means is configured to mount said sheet means such that said expansive cooking surface of said platen means is isolated from said grill by said sheet means.

7. A two-sided cooking device in accordance with claim 1, wherein said arm support means, includes
    a pair of support rails positioned on respective opposite sides of said platen means, each said support rail including a spacing portion disposed adjacent said cooking surface to provide spacing means for locating said platen in said first active position, each said support rail further including a support portion joined to said spacing portion to provide support means for supporting said platen in said second inactive position.

8. A two-sided cooking device in accordance with claim 7, wherein
    each said support rail includes an arcuate corner portion respectively joining said spacing means and support means to permit manipulation of said platen means between said first and second positions by rocking said platen means about said arcuate corner portions of said support rails without lifting of said platen means off of said grill.

9. A two-sided cooking device in accordance with claim 1, including
    control means remote from said platen means for regulating said platen means, said flexible cable means comprising a heat-resistant flexible cable operatively joining said control means and said platen means.

10. A two-sided cooking device in accordance with claim 1, including a housing within which said platen means is positioned, and insulation means for minimizing heating of said housing by said platen means.

11. A cooking device according to claim 1 wherein said platen is substantially less than half the horizontal extent of said grill.

12. A cooking device for two-sided cooking of food products such as hamburger patties on a grill, comprising:

a housing;

electrically-powered platen means joined to said housing and defining an expansive cooking surface;

a pair of spacing and support arms operatively joined to said platen means for maintaining a predetermined spacing between said platen and said grill when said platen is positioned in a first, active position generally parallel to said grill with said food products positioned between said platen and said grill; and for supporting said platen in a second, inactive, upright portion, each of said support rails including an arcuate portion about which said housing and said platen means can be rocked between said first lowered and second upright positions without lifting said housing and said platen means off of said grill;

control means remote from said housing for regulating said platen means; and flexible electrical cable means operatively joining said control means and said platen means.

13. A two-sided cooking device in accordance with claim 12, including means for adjusting said predetermined spacing between said cooking surface and said grill.

14. A two-sided cooking device in accordance with claim 12, including support means for supporting said housing and said platen means on said grill with said cooking surface generally vertically oriented, whereby said housing and said platen means are movable between a first lowered position wherein said cooking surface is parallel to said grill and said food products for effecting two-sided cooking thereof, and a second inactive, upright position wherein said housing and said platen means are supported on said grill by said support means.

15. A two-sided cooking device in accordance with claim 14, including means on said housing for rocking said housing and said platen means between said first lowered and second upright positions without lifting said housing and said platen means off of said grill.

16. A two-sided cooking device in accordance with claim 14, including low-friction sheet means juxtaposed to said cooking surface for contact with said food products, and means for removably mounting said sheet means in juxtaposition to said cooking surface.

17. A two-sided cooking device in accordance with claim 16, including handle means for manipulating said housing and said platen means between said first and second positions.

18. A two-sided cooking device in accordance with claim 16, wherein said means for removably mounting said sheet means is configured to mount said sheet means such that said expansive cooking surface is isolated from said grill by said sheet means.

19. A two-sided cooking device in accordance with claim 18, wherein said expansive cooking surface is generally rectangular, said means for removably mounting said sheet means comprising a pair of support rails and spring clip means for removably securing said support rails to said platen means on respective first opposite sides of said cooking surface, with said sheet means held captive between said support rails and said platen means, each said support rail including a spacing portion, said spacing portions providing said spacing means for maintaining said predetermined spacing between said cooking surface and said grill, said means for removably mounting said sheet means further comprising attachment rails and clip means for removably mounting said sheet means generally at second opposite sides of said cooking surface, whereby said sheet means can be mounted to isolate said generally rectangular cooking surface of said platen means from said grill.

20. A cooking device for two-sided cooking of food products such as hamburger patties on a grill, comprising:

heatable platen means defining an expansive cooking surface;

means for supplying energy to said platen means and for permitting selective positioning of said platen means on said grill through a range of horizontal positions;

a pair of spacing rail means joined to said platen means for maintaining a predetermined spacing between said expansive platen cooking surface and said underlying grill when said cooking surface is positioned in closely spaced, generally parallel relation to said grill, whereby said platen means is positionable above food products on said grill for effecting two-sided cooking of said food products; and a pair of support rail means for supporting said platen means with said cooking surface positioned away from said grill in an inactive position.

21. A cooking device for two-sided cooking of food products such as hamburger patties on a grill, comprising:

electrically-powered platen means defining an expansive cooking surface and adapted to be located at any one of a horizontal range of positions on said grill;

flexible power supply means of sufficient length to supply power to said platen means at any one of the horizontal range of positions of said platen means on said grill; and support means for supporting said platen in either of two positions, the support means including spacing means affixed to said platen means but free of said grill for maintaining a predetermined spacing between said platen cooking surface and said grill when said platen cooking surface is positioned in closely spaced, generally parallel relation to said grill, said platen means thus being positionable above food products on said grill at any one of a range of horizontally spaced positions in a first, active position for effecting two-sided cooking of said food products, the support means further including means extending from said device for supporting the platen in a second inactive position having said cooking surface positioned away from said grill in a generally upright position.

22. A cooking device according to claim 21 wherein said support means further includes arcuate portions about which the device can be rocked, when the device is being moved between said first and second positions.

23. A cooking device according to claim 21 wherein said support means extending from said device includes at least one support strut extending from a device handle.

* * * * *